United States Patent [19]
Matsumoto

[11] Patent Number: 5,448,378
[45] Date of Patent: Sep. 5, 1995

[54] DATA TRANSMITTING APPARATUS AND METHOD FOR EXECUTING BOTH FACSIMILE COMMUNICATION AND DATA COMMUNICATION WITHOUT SUSPENDING A COMMUNICATION LINE

[75] Inventor: Sei Matsumoto, Yokohama, Japan

[73] Assignee: Matsushita Graphic Communication Systems, Inc., Japan

[21] Appl. No.: 162,892

[22] Filed: Dec. 8, 1993

[30] Foreign Application Priority Data

Dec. 16, 1992 [JP] Japan .................. 4-335745

[51] Int. Cl.⁶ .............................................. H04N 1/32
[52] U.S. Cl. .................... 358/468; 358/434; 358/437; 358/438; 358/435
[58] Field of Search .......... 358/468, 442, 434, 400, 358/426, 435, 436, 437, 438, 439, 440, 469, 407, 405; 379/100, 93, 216, 98, 97; 375/8

[56] References Cited

U.S. PATENT DOCUMENTS

| | | | |
|---|---|---|---|
| 4,964,154 | 10/1990 | Shimotono | 379/100 |
| 4,974,253 | 11/1990 | Hashimoto | 379/100 |
| 5,022,071 | 6/1991 | Mozer et al. | 379/100 |
| 5,048,078 | 9/1991 | Satomi et al. | 379/100 |
| 5,065,427 | 11/1991 | Godbole | 379/100 |
| 5,086,455 | 2/1992 | Satomi et al. | 379/100 |
| 5,255,311 | 10/1993 | Yoshida | 358/468 |
| 5,257,117 | 10/1993 | Kang et al. | 358/468 |
| 5,267,302 | 11/1993 | Kotani et al. | 379/100 |
| 5,280,519 | 1/1994 | Nakajima | 358/442 |
| 5,287,402 | 2/1994 | Nakajima | 379/100 |

FOREIGN PATENT DOCUMENTS 4-168863 6/1992 Japan .
4-369154 12/1992 Japan .

*Primary Examiner*—Edward L. Coles, Sr.
*Assistant Examiner*—Fan Lee
*Attorney, Agent, or Firm*—Parkhurst, Wendel & Rossi

[57] ABSTRACT

A signal sending device (facsimile modem 66; step STA2) responds a call from a calling party and sends a first signal (CED signal) to the calling party. The first signal (CED signal) indicates that a non-voice terminal of the called party is connected to a communication line in response to the call from the calling party. A signal detecting device (facsimile modem 66; step STA3) detects a second signal (CNG signal) while the first signal (CED signal) is sent out from the signal sending device. The second signal (CNG signal) indicates that the calling party is a non-voice terminal. A mode switching device (CPU 61, data modem 65, I/O controller 67; step STA9) automatically changes communication mode from a facsimile mode to a data communication mode when the signal detecting device does not detect the second signal (CNG signal) while the first signal (CED signal) is sent out. A communication control device (CPU 61, facsimile modem 66, I/O controller 67; step STA11) continues detection of the second signal and changes the communication mode from the data communication mode to the facsimile mode whenever the second signal is detected.

13 Claims, 6 Drawing Sheets

DATA TRANSMITTING APPARATUS AND METHOD FOR EXECUTING BOTH FACSIMILE COMMUNICATION AND DATA COMMUNICATION WITHOUT SUSPENDING A COMMUNICATION LINE

BACKGROUND OF THE INVENTION

1. Field of the Invention

The present invention relates to a data communication apparatus and method in which whether the communication partner is a facsimile equipment or a personal computer is detected, and both facsimile communication and data communication can be executed consecutively by automatically switching from one mode to the other mode without suspending a communication line no matter from which the data is first transmitted between the facsimile equipment and the personal computer of the communication partner.

2. Description of the Related Art

So-called facsimile communication is to transmit picture or image information through the telephone line to a facsimile equipment of the other party, executed according to T.30 of the International Committee For Telephone And Telegraph. For this facsimile communication a modem device, transforming digital picture or image data compressed into analogue signals, is utilized to connect an interface of the facsimile equipment with the telephone line. The analogue signals are then transmitted through the telephone line to the facsimile equipment of the other party for execution of facsimile communication.

On the other hand, so-called data communication is to transmit character or letter information to a personal computer of the other party. For this data communication another modem device, transforming digital character data coded into analogue signals, is utilized to connect an interface of the personal computer with the telephone line.

Besides normal telephone conversations, the use of the telephone line has recently increased greater and greater for facsimile communications. Due to development of the telephone communication technologies, utility of the telephone line today extends to the computer field for execution of data communications between personal computers.

2.1. Previously Proposed Art

A conventional communication system using personal computers will be explained with reference to FIGS. 6 and 7.

FIG. 6 is a schematic diagram showing a data communication system between a personal computer 1a of a calling party and a personal computer 1b of a called party via the telephone line 3. The telephone line 3 is analogue, whereas the data communication apparatus such as personal computers 1a, 1b and the facsimile communication apparatus such as facsimile equipments are based on digital processing. Accordingly, a means for converting digital data to analogue signals or vice versa is indispensable for computer communications. For this reason, the personal computer 1a of the calling party is equipped with a communication control device 2a while the personal computer 1b of the called party is equipped with a same-type communication control device 2b, respectively. These communication control devices 2a and 2b, dedicated as data modem, have function to connect the personal computer (1a or 1b) to the telephone circuit 3, respectively.

FIG. 7 is a schematic diagram showing another communication system between the personal computer 1a of the calling party and the personal computer 1b of the called party via the telephone line 3, wherein each of the personal computers 1a and 1b is equipped with a facsimile mode 4a and a data modem 4b for selectively executing data and facsimile communications between two personal computers 1a and 1b. The facsimile modem 4a of the personal computer 1a is, of course, activated for communications with a facsimile equipment 5.

2.2. Problems to be Solved by the Invention

A problem in executing both data and facsimile communications by personal computers is that the personal computers have to be equipped with different, two in total, modems independent of each other. Because, the data communication and the facsimile communication need to follow different communication sequence, respectively. Necessity of two modems will naturally take a significant time to switch the communication mode between data and facsimile communications. For example, successive execution of both data and facsimile communications will force an operator of a calling party to manipulate a dip switch to switch the modem between two. On the other hand, an operator of a called party needs to accomplish troublesome initial setting for manual determination of the communication mode.

SUMMARY OF THE INVENTION

Accordingly, in view of above-described problems encountered in the background art, an object of the present invention is to provide a data transmitting apparatus which discriminates what kind of signal is transmitted from a communication device of the communication partner, and automatically establishes a suitable modem for communication on the basis of the result of the discrimination.

In order to accomplish the above purposes, a first aspect of the present invention provides a signal sending means which responds a call from a calling party and sends a first signal to the calling party. This first signal indicates that a non-voice terminal of the called party is connected to a communication line in response to the call from the calling party. While the first signal is sent out from the signal sending means, a signal detecting means detects a second signal. This second signal indicates that the calling party is a non-voice terminal. Thereafter, a mode switching means automatically changes the communication mode from a facsimile mode to a data communication mode when the signal detecting means does not detect the second signal while the first signal is sent out.

Furthermore, in accordance with a second aspect of the present invention, a signal sending means responds a call from a calling party and sends the calling party a first signal indicating that a non-voice terminal of the called party is connected to a communication line in response to the call from the calling party. While the first signal is sent out from the signal sending means, a signal detecting means detects a second signal indicating that the calling party is a non-voice terminal. A mode switching means automatically changes communication mode from a facsimile mode to a data communication mode when the signal detecting means does not detect the second signal while the first signal is sent out.

A communication control means continues detection of the second signal and changes the communication mode from the data communication mode to the facsimile mode whenever the second signal is detected.

Still further, in accordance with a third aspect of the present invention, an instructing means gives an instruction in advance. This instruction commands a transfer to a facsimile communication mode after finishing a data communication mode. A signal sending means sends an opponent party a command generated based on the instruction. A signal detecting means detects a facsimile signal sent from the opponent party within a predetermined time after the data communication is terminated. A mode switching means switches the communication mode from the data communication mode to the facsimile communication mode in response to the facsimile signal detected by the signal detecting means.

Yet further, in accordance with a fourth aspect of the present invention, an instructing means gives an instruction after finishing a data communication mode. This instruction requests a transfer to a facsimile communication mode. A signal sending means responds the instruction and stops a carrier being sent out. A signal detecting means waits arrival of a signal sent from an opponent party without disconnecting a communication line even after the carrier is stopped by the signal sending means. A mode switching means switches the communication mode from the data communication mode to the facsimile communication mode in response to a facsimile signal detected by the signal detecting means.

Moreover, in accordance with a fifth aspect of the present invention, an instructing means gives an instruction in advance. This instruction commands a transfer to a data communication mode after finishing a facsimile communication mode. A signal sending means sends an opponent party a facsimile signal based on the instruction. A signal detecting means detects a data communication signal sent from the opponent party within a predetermined time after the facsimile communication is terminated. And, a mode switching means switches the communication mode from the facsimile communication mode to the data communication mode in response to the data communication signal detected by the signal detecting means.

Still further, in accordance with a sixth aspect of the present invention, an instructing means gives an instruction in advance. This instruction commands a transfer to a data communication mode after finishing a facsimile communication mode. A signal sending means sends an opponent party a facsimile signal based on the instruction. A communication control means terminates communication without executing data communication instructed by the instruction means by stopping a carrier being sent out after receiving image data, when another instruction is given for canceling the transfer to the data communication mode.

Furthermore, in accordance with a seventh aspect of the present invention, a signal detecting means detects a facsimile signal. An analyzing means analyzes the facsimile signal. A judging means judges as to whether or not the facsimile signal includes a request of transfer to a data communication after finishing a facsimile communication. Thereafter, a communication control means responds a judging result of the judging means and, if the facsimile signal indicates that the data communication is to be successively executed after finishing the facsimile communication, sends out a signal directing initiation of the data communication after sending out image data, so as to switch communication mode from the facsimile communication mode to the data communication mode.

Moreover, in accordance with an eighth aspect of the present invention, a signal detecting means detects a facsimile signal. An analyzing means analyzes the facsimile signal. A judging means judges as to whether or not the facsimile signal includes a request of transfer to a data communication after finishing a facsimile communication. And, a communication control means responds a judging result of the judging means and, if the facsimile signal indicates that the data communication is to be successively executed after finishing the facsimile communication, sends out an interrupt signal directing interrupt after sending out image data and a signal directing initiation of the data communication after a predetermined time has elapsed since the interrupt of the facsimile communication, so as to switch the communication mode from the facsimile communication mode to the data communication mode.

BRIEF DESCRIPTION OF THE DRAWINGS

The above and other objects, features and advantages of the present invention will Become more apparent from the following detailed description which is to be read in conjunction with the accompanying drawings, in which.

DETAILED DESCRIPTION OF THE PREFERRED EMBODIMENT

Hereinafter, a preferred embodiment of the present invention will be explained in detail with reference to accompanying drawings.

Figure 1:
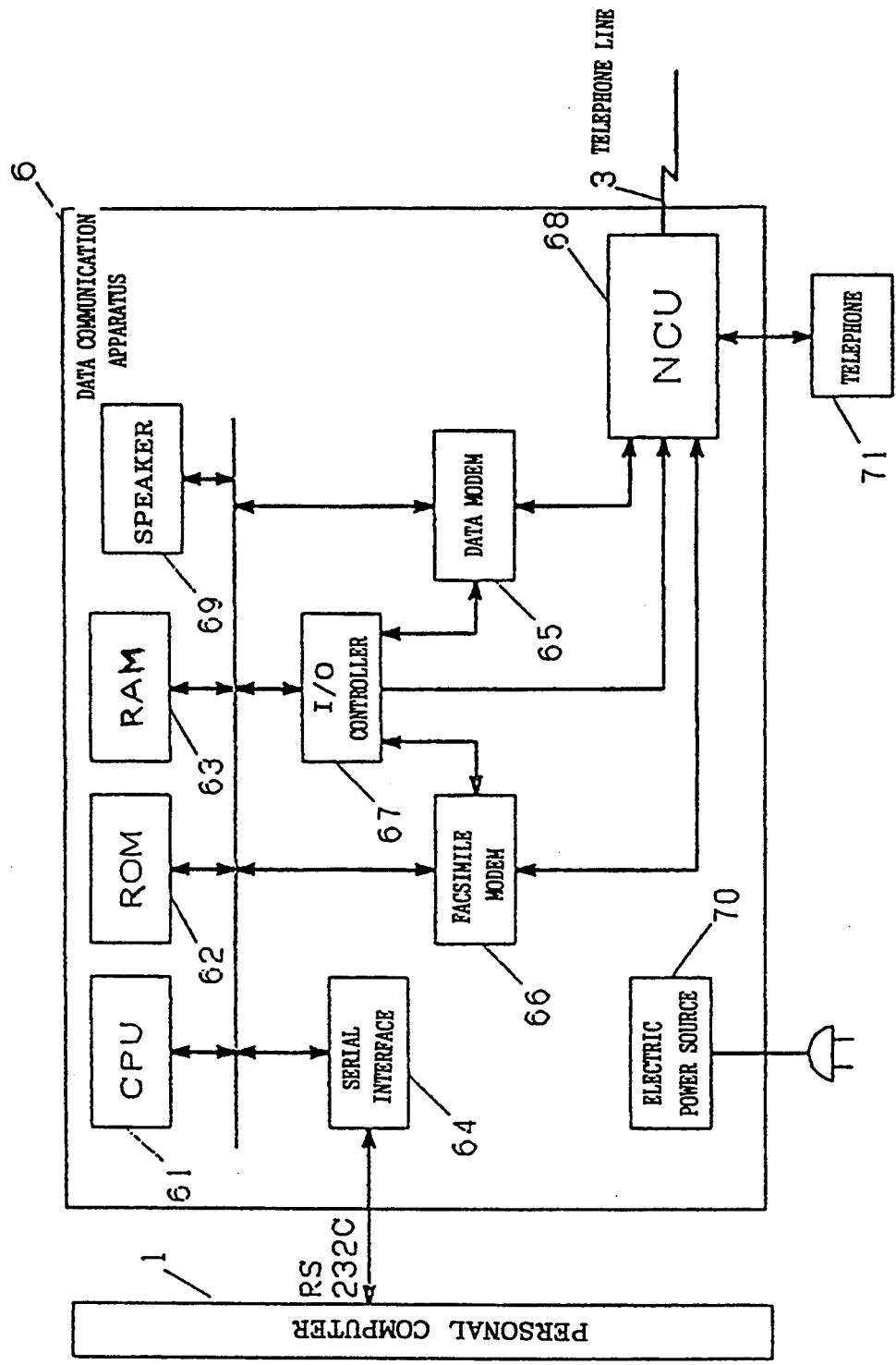
FIG. 1 is a block diagram schematically showing a data transmitting apparatus in accordance with one embodiment of the present invention.

In FIG. 1, a reference numeral 6 represents a data communication apparatus in accordance with the present invention. The data communication apparatus 6 comprises: a CPU (Central Processing Unit) 61 performing various controls for communications; a ROM 62 storing control programs; a RAM 63 storing data including communication data; a serial interface 64 transmitting and receiving data to and from a personal computer through a RS-232C interface; a data modem 65 modulating and demodulating data communication signals; a facsimile modem 66 modulating and demodulating facsimile communication signals; an I/O controller 67 selectively activating the data modem 65 or the facsimile modem 66 on the basis of the kind of communication signal; a network control unit (NCU) 66; a speaker 69 notifying an operator of a call accepted; an electric power source 70; and a telephone equipment 71 used for conversation. In this embodiment, the CPU 61 makes a judgement as to whether an accepted signal is based on data communication or facsimile communication. The personal computer 1 performs encoding and decoding processing (i.e. CODEC). It is, however, noted that the I/O controller 67 can have CODEC function as well.

Figure 2:
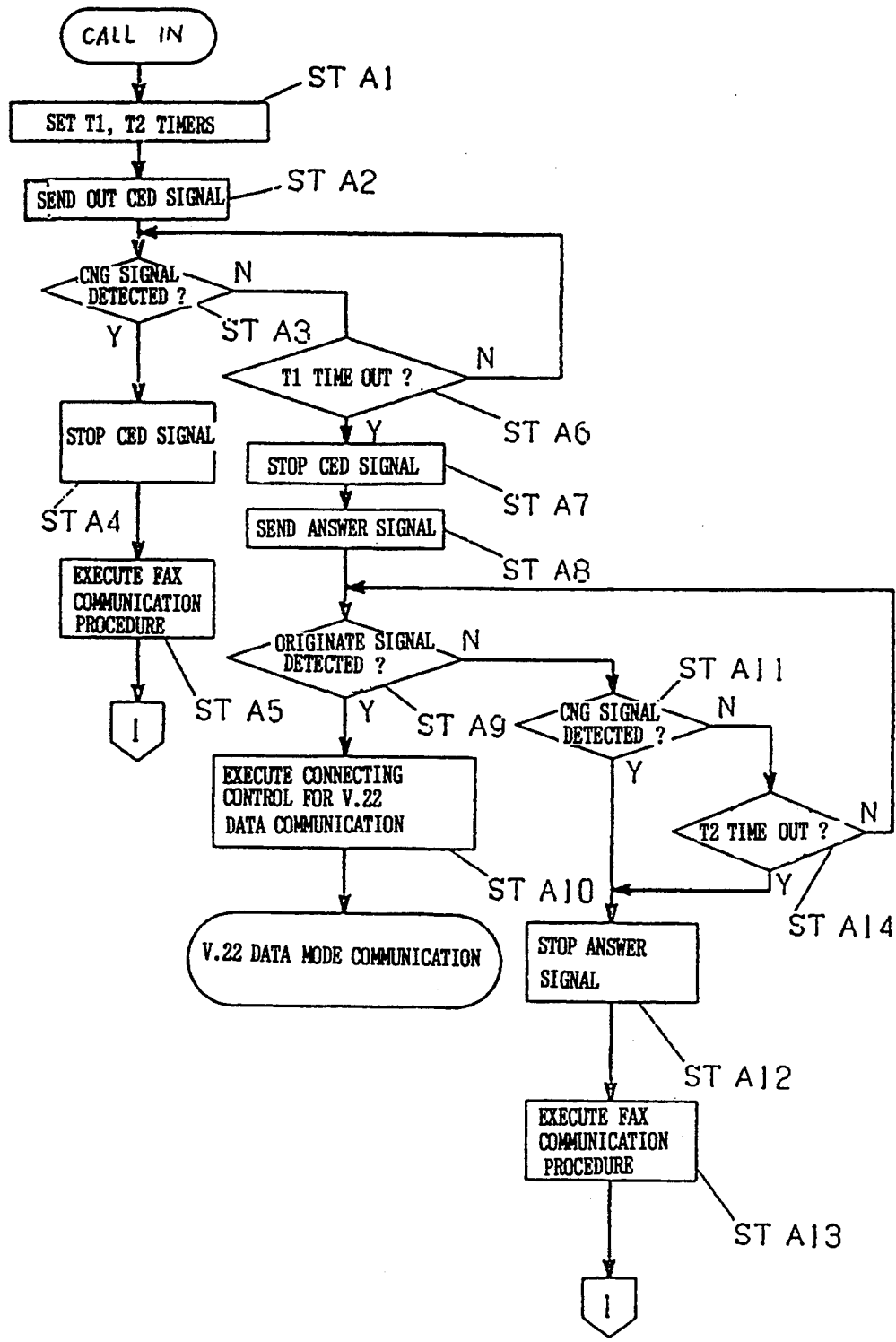
FIG. 2 is a flowchart showing a part of automatic switching operation between data communication and facsimile communication.
Figure 3:
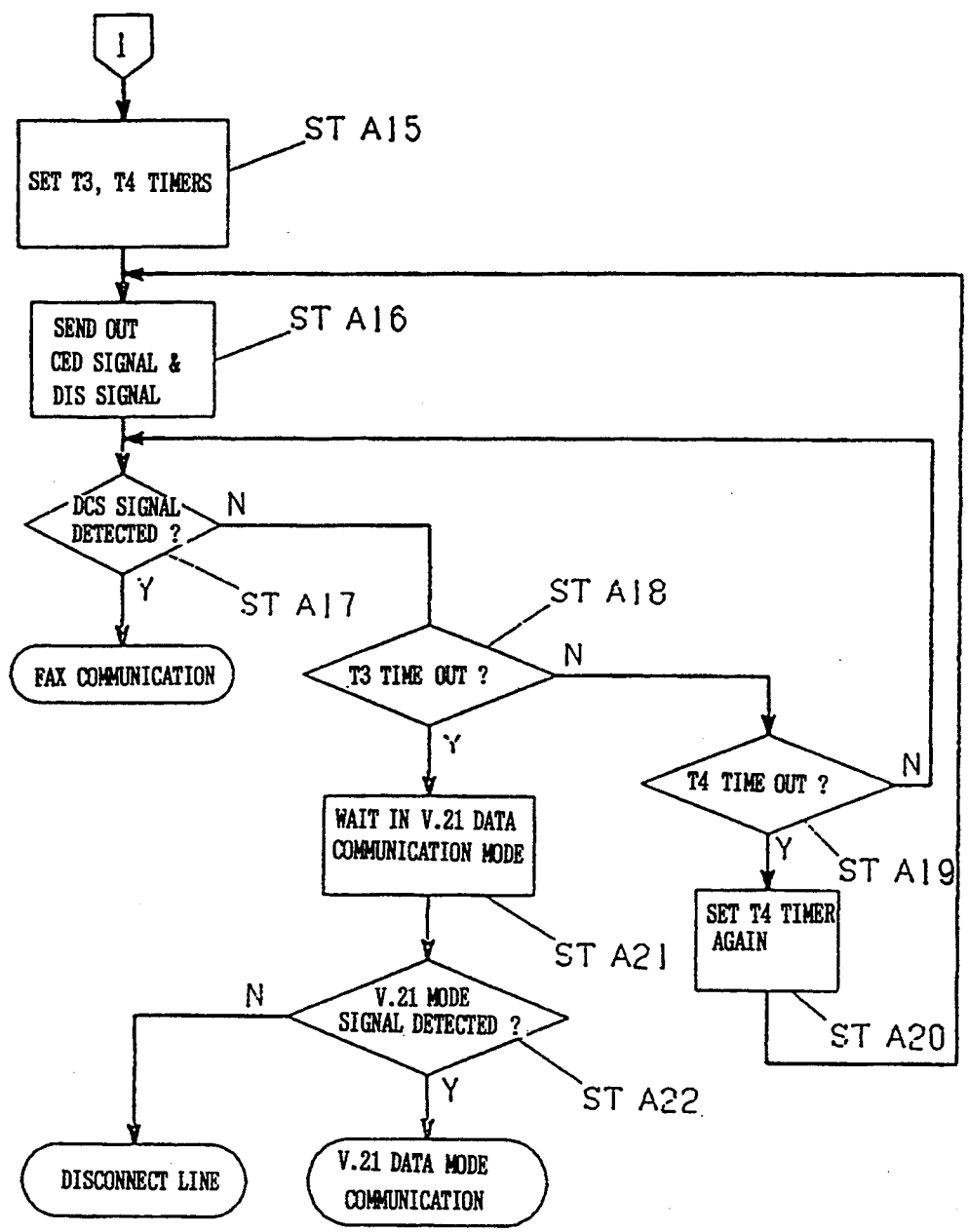
FIG. 3 is a flowchart showing the remaining part of the above automatic switching operation.

Hereinafter, an automatic switching operation between data communication and facsimile communication of the data communication apparatus 6 will be explained with reference to FIGS. 2 and 3. First of all, a calling party makes a telephone call to a called party via the telephone line 3. Upon the NCU 66 detecting this calling signal, the data communication apparatus 6 and the personal computer i are situated in called condition. In a step STA1, the data communication apparatus 6 sets a timer 1 having a count-up period T1 and a timer 2 having a count-up period T2. The count-up period T1 represents a time required for detecting a CNG signal which indicates that an opponent party is a facsimile equipment, which is regulated within a range 2.6–4.0 sec according to the regulation of the CCITT (*Comite Consultatif Internationale Telegraphique et Telephonique*). The count-up period T2 represents a time required for detecting an originate signal which indicates that an opponent party is a data terminal such as a personal computer. It is preferable to determine this count-up period T2 by taking account of a minimum time required for the calling party to detect an answer signal sent from the called party and subsequently to send an originate signal to the called part. In this embodiment, the count-up period T2 is set to approximately 8 sec, adding the required minimum time and the above count-up period T1.

Next, in a step STA2, the facsimile modem 66 starts sending out a CED (i.e. called station discrimination) signal to the calling party. With this CED signal, it is indicated that the telephone line has been connected to the non-voice terminal of the called party. Although this embodiment uses the facsimile modem 66, it is also possible to utilize the data modem 65 for sending out the CED signal because this signal is commonly used for the data communication.

During elapse of the count-up period T1, i.e. during a sending-out time of the CED signal, it is checked whether or not a CNG signal is detected by the called party. The CNG signal indicates that a non-voice terminal of the calling party is connected to the telephone line. More specifically, in a step SRA3, a judgement is made as to whether the CNG signal is detected or not. If the judgement result is NO in the step STAB, the CPU 61 of the data communication apparatus 6 proceeds to a step STAB to check whether or not the count-up period T1 has elapsed. If the count-up period T1 has not elapsed yet, the CPU 61 returns to the step STAB to repeat the same procedure.

If the CNG signal is detected in the step STAB, the CPU 61 immediately proceeds to a step STA4 to stop the CED signal. After that, the CPU 61 proceeds to a step STA5 to execute the facsimile communication procedure according to T.30 of the CCITT regulation. In this case, stoppage of the CED signal can be performed even after the count-up period T1 has completely elapsed. On the other hand, if the CNG signal has not been detected during the count-up period T1 (i.e. YES in the step STAB), the CPU 61 proceeds to a step STA7 to stop the CED signal. Then, in a step STA8, the data modem 65 of the data communication apparatus 6 sends an answer signal.

Subsequently, in steps STA9, STA11, and STA14, arrival of an originate signal or a CNG signal sent from the calling party is waited until the count-up period T2 has elapsed. Namely, in the step STA9, a judgement is made as to whether or not the originate signal is detected. Here, the originate signal is a signal indicating a data communication mode. If the judgement is NO in the step STA9, the CPU 61 proceeds to a step STA11 to further make a judgement as to whether or not the CNG signal is detected or not. If the originate signal is detected in the step STA9, the CPU 61 proceeds to a step STA10 to cause the data communication apparatus 6 to execute a connecting operation for data communication according to V.22 of the CCITT regulation. Then, the data communication apparatus 6 starts the data communication in accordance with V.22 data mode.

Namely, in accordance with a data communication apparatus of the present invention, a signal sending means (facsimile modem 66; step STA2) responds a call from a calling party and sends the calling party a first signal (CED signal) which indicates that a non-voice terminal of the called party is connected to a communication line in response to the call from the calling party. Then, a signal detecting means (facsimile modem 66; step STA3) detects a second signal (CNG signal) while the first signal (CED signal) is sent out from the signal sending means. With this second signal (CNG signal), it is recognized that the calling party is a non-voice terminal. Thereafter, a mode switching means (CPU 61, I/O controller 67; step STA9) automatically changes the communication mode from a facsimile mode to a data communication mode when the signal detecting means (facsimile modem 66) does not detect the second signal (CNG signal) while the first signal (CED signal) is sent out.

If the CNG signal arrives within the count-up period T2 even after the count-up period T1 passed (YES in the step STA11), the CPU 61 proceeds to a step STA12 to stop the answer signal and subsequently goes on to a step STA13 to execute the facsimile communication procedure according to T.30 of the CCITT regulation.

Thus, in accordance with another aspect of the present invention, a signal sending means (facsimile modem 66; step STA2) responds a call from a calling party and sends the calling party a first signal (CED signal) which indicates that a non-voice terminal of the called party is connected to a communication line in response to the call from the calling party. While the first signal (CED signal) is sent out from the signal sending means, a signal detecting means (facsimile modem 66; step STA3) detects a second signal (CNG signal) which indicates that the calling party is a non-voice terminal. A mode switching means (CPU 61, data modem 65, I/O controller 67; step STA9) automatically changes communication mode from a facsimile mode to a data communication mode when the signal detecting means does not detect the second signal (CNG signal) while the first signal (CED signal) is sent out. A communication control means (CPU 61, facsimile modem 66, I/O controller 67; step STA11) continues detection of the second signal and changes the communication mode from the data communication mode to the facsimile communication mode whenever the second signal is detected.

If the count-up period T2 has completely elapsed (YES in the step STA14), it means that the data communication apparatus 6 has detected neither the CNG signal nor the originate signal during this count-up period T2. In this case, the present invention prevents the data communication apparatus 6 from being disconnected from the telephone line 3. Namely, the CPU 61 proceeds to the above-described steps STA12 and STA13 to execute the facsimile communication procedure without disconnecting the telephone line 3.

The purpose of maintaining connection between the data communication apparatus 6 and the telephone line 3 is to establish an acceptable condition to any type facsimile equipment. Because, some facsimile machines do not generate the CNG signal. Therefore, if the procedure defined by the steps STA14, STA12, and STA13 is not provided, communication with the facsimile machines generating no CNG signals will not be assured. Furthermore, even if the calling party is a facsimile machine generating the CNG signal, the called party may miss the CNG signal if the called party is busy to transmit another signal to the calling party. Accordingly, the procedure executing the steps STA14, STA12, and STA13 solves above-described problems.

Once the data communication apparatus 6 proceeds to the facsimile communication procedure, the data communication apparatus 6 sets a timer 3 having a count-up period T3 and a timer 4 having a count-up period T4 in a step STA15. Here, the count-up period T3 represents a time required for waiting for a DCS (i.e. digital command) signal after sending out a DIS (i.e. digital discrimination) signal, which is determined approximately 20 sec according to the regulation of the CCITT. The count-up period T4 represents a sending-out time of the DIS signal, which is regulated to be 3 sec. These count-up periods T3 and T4 are changeable depending on the setting of the program.

Next, in a step STA16, the data communication apparatus 6 sends the CED signal and the DIS signal. Then, a judgement is made as to whether or not the DCS signal is detected in response to the CED and DIS signals. More specifically, the CPU 61 proceeds to a step STA17 to make a judgement as to whether or not the DCS signal is detected. If the judgement result is NO in the step STA17, the CPU 61 proceeds to a step STA18 to check whether or not the count-up period T3 has elapsed. If the count-up period T3 has not elapsed (NO in the step STA18), the CPU 61 proceeds to a step STA19 to further check whether or not the count-up period T4 has elapsed. If the judgement result is NO in the step STA19, the CPU 61 returns to the step STA17 to wait the detection of the DCS signal. If the count-up period T4 has elapsed (YES in the step STA19), the CPU 61 proceeds to a step STA20 to newly set the count-up period T4 to the timer 4. Then, the CPU 61 returns to the step STA16. In other words, the DIS signal is sent out repeatedly as long as the count-up time T3 has not yet completely elapsed.

In this manner, the data communication apparatus 6 in accordance with the present invention, after stopping the CED signal, waits for a signal (i.e. an answer signal) sent from the calling party in the data communication mode. Thereafter, if the count-up time T2 has passed, the data communication apparatus 6 sends out the DIS signal to transfer to the facsimile communication mode. With this arrangement, it becomes possible to automatically switch the mode between the facsimile communication mode and the data communication mode without disconnecting the telephone line.

On the contrary, in a case where the data communication apparatus transfers to the data communication mode after finishing the facsimile communication mode, it is usually impossible to control communication in accordance with the data communication mode because the control sequence of facsimile communication must inherently include a non-signal state. This non-signal state forcibly disconnects the telephone line; therefore, the communication is no longer continued. Namely, in the case of the data communication mode, the telephone line is soon disconnected upon interrupt of a carrier. Above non-signal state in the facsimile communication is equivalent to this interrupt of the carrier. This non-signal state, i.e. carrier interrupt condition, normally continues until the DCS signal is detected after the DIS signal is sent out.

In order to prevent undesirable disconnection of the telephone line, it will be possible to make an agreement to transfer to the data communication mode in advance in the facsimile communication mode. However, this agreement must be performed in accordance with non-standard procedure, which will result in the fact that the facsimile communication cannot be executed in accordance with the standard procedure. In this respect, the present embodiment allows the data communication apparatus to automatically set the facsimile communication mode after finishing the data communication mode. Thus, both of the data communication mode and the facsimile communication mode are feasible according to the standard procedure.

Returning to the step STA18, if the count-up period T3 has completely elapsed, the CPU 61 proceeds to a step STA21 to transfer to the V.21 data communication mode of the CCITT regulation. Then, in a step STA22, a judgement is made as to whether or not a signal of the V.21 data mode is detected. If the judgement is YES in the step STA22, the data communication apparatus 6 establishes the V.21 data communication mode. On the other hand, if the V.21 data mode signal is not detected in the step STA22, the data communication apparatus 6 is disconnected from the telephone line 3.

The reason why the V.21 data communication mode is established even after the count-up period T3 has passed is that the V.21 data communication mode has possibility of enabling some communications under the carrier interrupt condition. For example, in a case where the calling party has a V.21 dedicated modem, the communication can be assured with this establishment of the V.21 data communication mode. It is, of course, possible to omit the steps transferring to the V.21 data communication mode in order, for example, to save the cost of telephone service. Furthermore, although the present embodiment explains about the V.22 mode, it is needless to say that other modes including V.22bis mode can be also embodied in accordance with the present invention.

In this manner, in the automatic switching operation between the facsimile communication mode and the data communication mode when received a call, the data communication apparatus 6 preferentially sets the data communication mode after stopping the CED signal for waiting arrival of the answer signal sent from the calling party. Namely, the switching of the mode can be automatically accomplished without disconnecting the telephone line. Thus, an operator is free from a complicated, manual, switching operation. Furthermore, the switching of the mode can be ensured.

Figure 4:
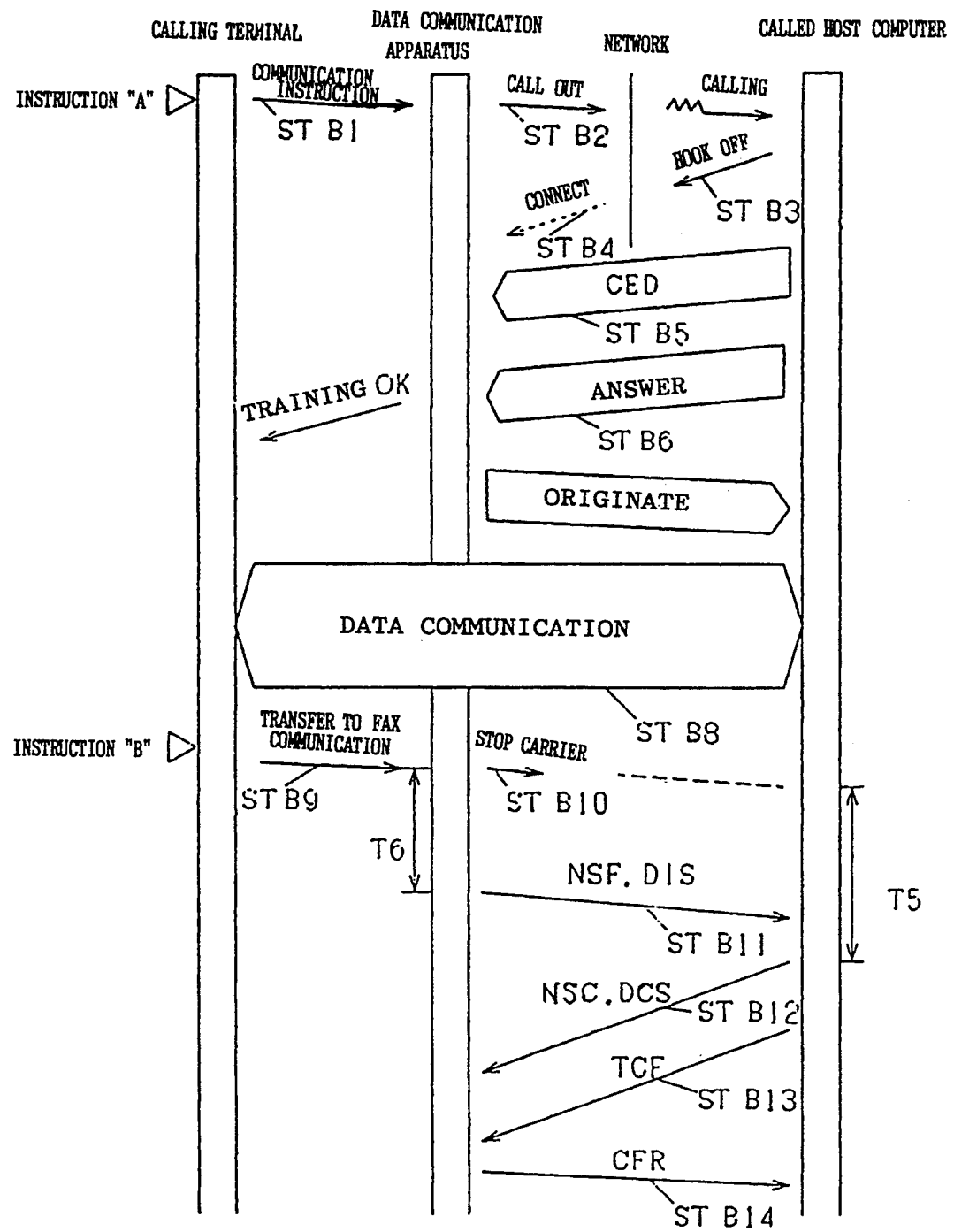
FIG. 4 is a diagram illustrating a part of automatic switching sequence between the data communication and the facsimile communication throughout the communication.
Figure 5:
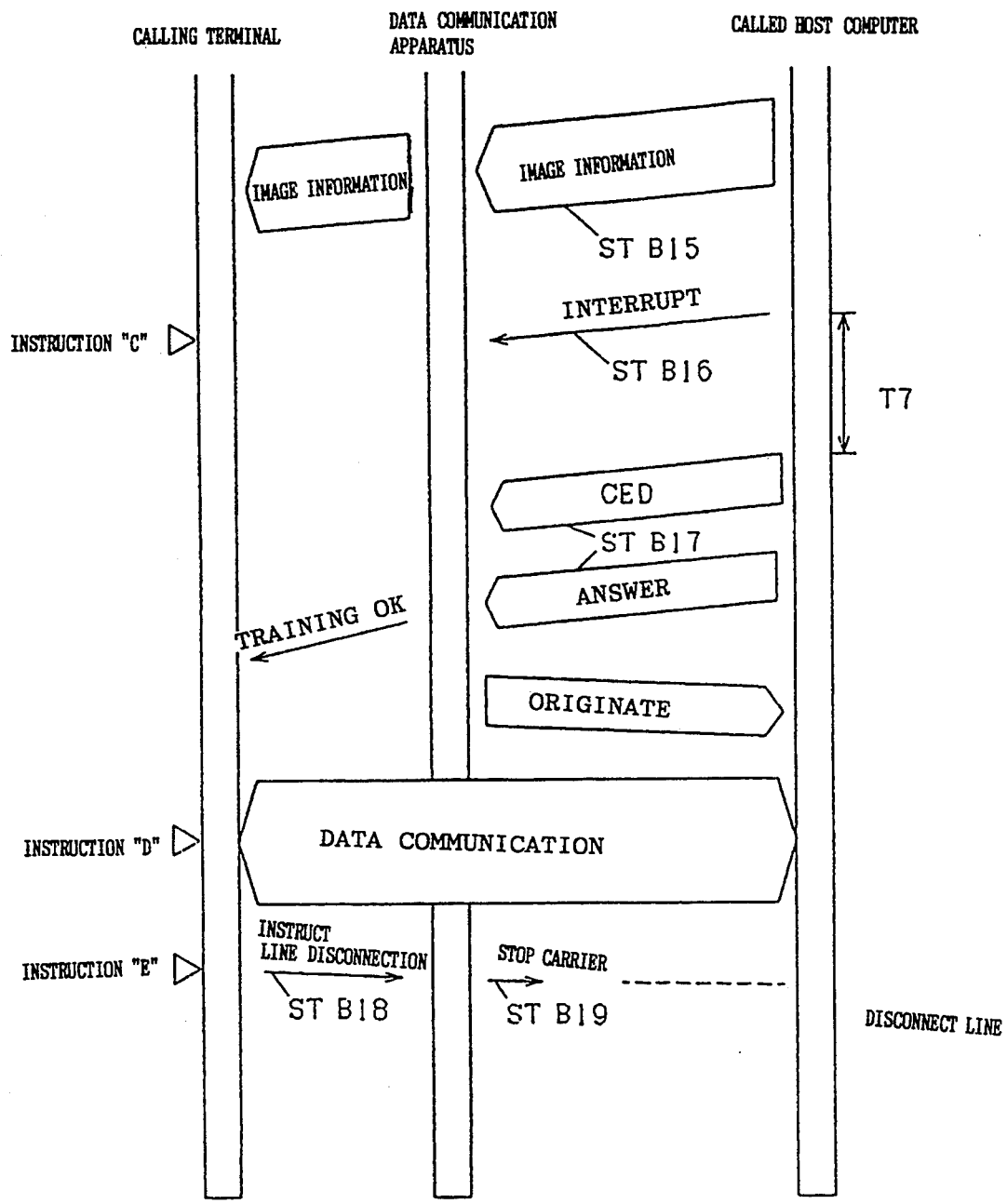
FIG. 5 is a diagram illustrating the remaining part of the above automatic switching sequence.
Figure 6:
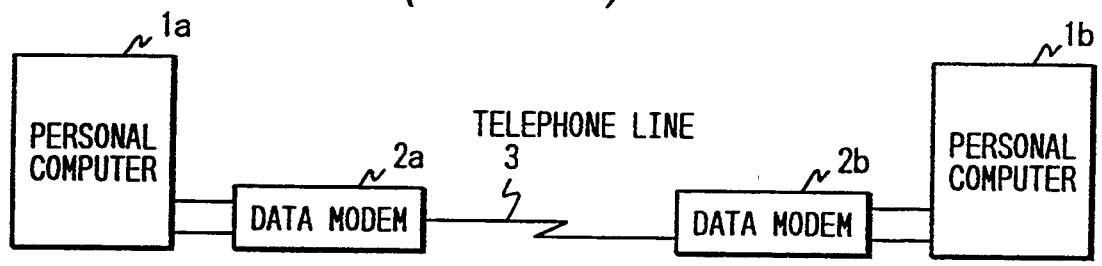
FIG. 6 is a schematic diagram showing a conventional data communication executed between two personal computers.
Figure 7:
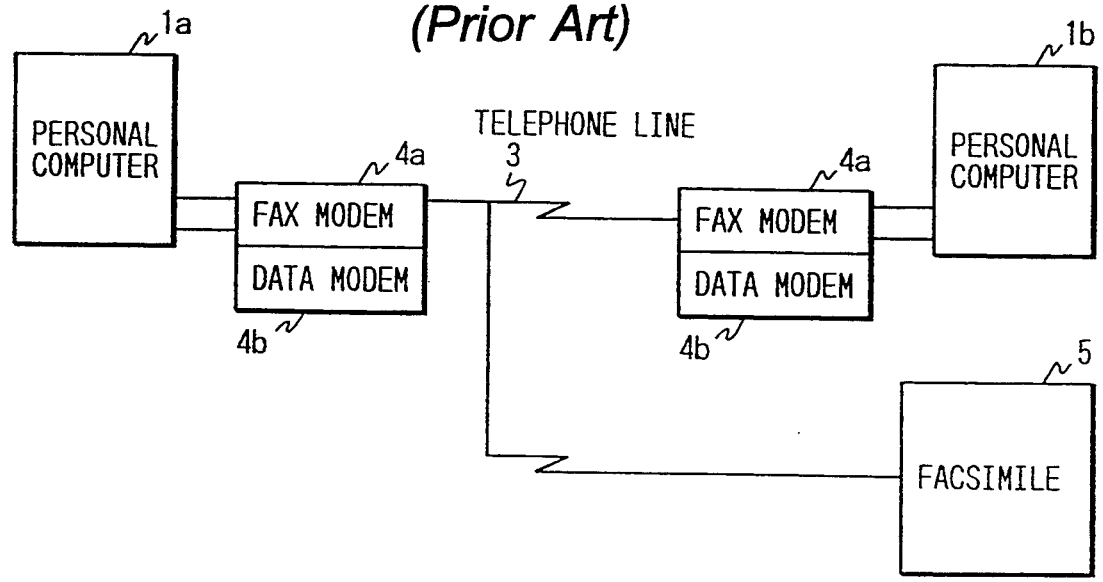
FIG. 7 is a schematic diagram showing a conventional facsimile communication executed between two personal computers.

Hereinafter, the automatic switching operation between the facsimile communication and the data communication will be explained with reference to FIGS. 4 and 5.

In the data retrieval operation, there is a need to directly obtain the resultant retrieval information as image data through the facsimile communication without re-connecting the line.

First of all, an operator activates the personal computer 1 associated with the data communication apparatus 6 before starting the communication. Upon direction of the data retrieval by the data communication, the personal computer 1 displays a message asking a question such as "Is the facsimile communication required after finishing the data communication?" on its display screen. The operator inputs "YES" manipulating a keyboard since the operator wants to do so in this case. The personal computer 1 sends a communication command to the data communication apparatus 6 in response to the input of the operator. On the other hand, if only the data retrieval is required, the operator will input "NO" to select the data communication alone. An instruction "A" of FIG. 4 represents these operations.

Next, a communication instructing command is sent from the calling data terminal, i.e. the personal computer 1, to the data communication apparatus 6 in accordance with the instruction "A". (Step STB1) The data communication apparatus 6 makes a telephone call on the basis of the communication instructing command. (Step STB2) In response to the call from the data communication apparatus 6, a called host computer closes the line loop connected to the network. (Step STB3) If connection of the telephone line is completed (Step STB4), the data communication apparatus 6 detects the CED signal sent from the host computer (Step STB5) and, subsequently, detects the answer signal also sent from the host computer (Step STB6).

Upon reception of the answer signal from the host computer, the data communication apparatus 6 returns the originate signal to the host computer. (Step STB7) This originate signal makes the host computer establish the data communication mode and start the data communication. (Step STB8)

In a case where the facsimile communication is required after finishing data retrieval through the data communication, the operator makes an instruction "B" commanding transfer to the facsimile communication. On the basis of the instruction 37 B", the calling data terminal sends the data communication apparatus 6 a command indicating transfer to the facsimile communication mode. (Step STB9) The data communication apparatus 6 stops the carrier being sent to the host computer. (STB10) By the way, the data communication is carried out in such a manner that one terminal responds to a command sent from the other terminal or vice versa. The nature of the data communication is therefore interactive. On the contrary, the facsimile communication is characterized in that it follows a predetermined communication sequence. Accordingly, no facsimile communication begins until the operator designates the switching timing by: the instruction "B". Namely, the instruction "B" is to used to notify the data communication apparatus 6 of the timing to stop the carrier. Upon the switching instruction to the facsimile communication, the personal computer 1 displays a message asking a question such as "Is the data communication required after finishing the facsimile communication?" on its display screen. Since the operator requests the data communication after finishing the facsimile communication, the operator inputs "YES". The instruction "B" of FIG. 4 represents the above operations.

If the carrier is disconnected (Step STB10), the host computer waits a predetermined time T5 to start the procedure for the facsimile communication without disconnecting the telephone line, following the instruction "A" which instructs to transfer to the facsimile communication. After a predetermined time T6 has elapsed since the interrupt of carrier, the data communication apparatus 6 spontaneously sends out an NSF (i.e. non-standard function discrimination) signal and a DIS signal, to initiate the procedure for the facsimile communication. (Step STB11) In the normal data communication, if the carrier is interrupted, the line will be disconnected. This embodiment, however, makes the host computer keep waiting without suspending the telephone line. Hence, it becomes possible to realize automatic switching to the facsimile communication. Since the called host computer keeps waiting for arrival of a signal for a predetermined time without disconnecting the line even if the carrier is interrupted, a complicated manual switching operation is no longer necessary and automatic switching operation is feasible.

Namely, in accordance with a data communication apparatus of the present invention, an instructing means (personal computer 1) gives an instruction (instruction "A") in advance. This instruction (instruction "A") commands a transfer to a facsimile communication mode after finishing a data communication mode. A signal sending means (data modem 65; step STB1) sends an opponent party (host computer) a command generated based on the instruction (instruction "A"). A signal detecting means (facsimile modem 66; step STB12) detects a facsimile signal (NSC signal) sent from the opponent party (host computer) within a predetermined time (T5) after the data communication is terminated. A mode switching means (CPU 61, I/O controller 67) switches the communication mode from the data communication mode to the facsimile communication mode in response to the facsimile signal (NSC signal) detected by the signal detecting means.

Next, there is a need to resume the retrieval again after obtaining the resultant retrieval information through the facsimile communication.

As the instruction "B" directs transferring to the data communication after finishing the facsimile communication, the calling data terminal sends the called host computer the NSF signal and the DIS signal. (Step STB11) As the mode switching from the facsimile communication to the data communication is not included in the standard procedure of the facsimile, it needs to follow the non-standard procedure. The NSF signal is assigned to the information to transfer to the data communication. Therefore, if there is no need to transfer to the retrieval after finishing the facsimile communication, the operator would input "NO" through the instruction "B" so as to prohibit the data communication apparatus 6 to execute the non-standard procedure. In this case, an NSF signal commanding non-transfer to the data communication will be sent out. More specifically, an FIF (Facsimile Information Field) contained in the NSF signal is assigned to the information regarding the transfer to the data communication after finishing the facsimile communication and also the information regarding the non-transfer to the data communication. It is also possible to follow the standard procedure instead of sending out the NSF signal commanding non-transfer to the data communication.

As the instruction "B" directs the transfer to the data communication after finishing the facsimile communication, the called host computer sends the data communication apparatus 6 an NSC (i.e. non-standard function command) signal, a DCS signal, and a TCF (i.e. training check) signal after training (Steps STB12, STB13). The data communication apparatus 6 returns a CFR (i.e. receiving setup confirmation) signal to the data communication apparatus 6 in order to notify the host computer of completion of receiving setup. (Step STB14)

Namely, in accordance with a data communication apparatus of the present invention, an instructing means (personal computer 1) gives an instruction (instruction "B") after finishing a data communication mode. This instruction (instruction "B") requests a transfer to a facsimile communication mode. A signal sending means (data modem 65; step STB10) responds the instruction (instruction "B") and stops a carrier being sent out. A signal detecting means (facsimile modem 66; steps STB11 and STB12) waits arrival of a signal sent from an opponent party (host computer) without disconnecting a communication line even after the carrier is stopped by the signal sending means. A mode switching means (CPU61, I/O controller 67) switches the communication mode from the data communication mode to the facsimile communication mode in response to a facsimile signal (NSC signal) detected by the signal detecting means.

The host computer sends the data terminal the retrieval result as image information. (Step STB15) The host computer usually sends an EOP (i.e. procedure end) signal when finishing transmission of the resultant retrieval information. However, the NSF signal notifies the host computer of the transfer to the data communication mode beforehand in this case. Therefore, after finishing transmission of resultant retrieval information, the host computer sends the data communication apparatus 6 a PIP (i.e. procedure interrupt positive) signal as an interrupt signal instead of the EOP signal. (Step STB16) The reason why the interrupt signal is sent out is as follows. In the case of the facsimile communication, the procedure of communication spontaneously advances if nothing has been done for a while after finishing transmission of image information. Namely, meaningless time elapse causes the host computer to generate a DCN (i.e. disconnect command) signal to disconnect the telephone line. Thus, it is necessary for the operator to stop generating the DCN signal by interrupting the communication procedure.

By the way, if the operator wants to end the communication even if the transfer to the data communication is selected, the operator can direct disconnection of the line by inputting an instruction "C". In this case, the data communication apparatus 6 stops the carrier and ends the communication.

That is to say, in accordance with a data communication apparatus of the present invention, an instructing means (personal computer 1) gives an instruction (instruction "B") in advance. This instruction (instruction "B") commands a transfer to a data communication mode after finishing a facsimile communication mode. A signal sending means (facsimile modem 66; step STB11) sends an opponent party (host computer) a facsimile signal (NSF signal) based on the instruction (instruction "B"). A communication control means (personal computer 1, CPU 61) terminates communication without executing data communication instructed by the instruction means by stopping a carrier being sent out after receiving image data, when another instruction (instruction "C") is given for canceling the transfer to the data communication mode.

If a predetermined time T7 has elapsed after sending out the interrupt signal, the host computer sends the data communication apparatus 6 a CED signal to automatically switch to the data communication mode. (Step STB17) Then, after exchanging control signals in accordance with the normal data communication, the data communication starts.

Thus, in accordance with the data communication apparatus of the present invention, an instructing means (personal computer 1) gives an instruction (instruction "B") in advance. This instruction commands a transfer to a data communication mode after finishing a facsimile communication mode. A signal sending means (facsimile modem 66; step STB11) sends an opponent party (host computer) a facsimile signal (NSF signal) based on the instruction (instruction "B"). A signal detecting means (data modem 65; step STB17) detects a data communication signal (answer signal) sent from the opponent party (host computer) within a predetermined time (T7) after the facsimile communication is terminated. And, a mode switching means (CPU 61, I/O controller 67) switches the communication mode from the facsimile communication mode to the data communication mode in response to the data communication signal (answer signal) detected by the signal detecting means.

Furthermore, in accordance with another aspect of the present invention, a signal detecting means (facsimile modem 66) detects a facsimile signal (NSF signal). An analyzing means (CPU 61) analyzes the facsimile signal (NSF signal). A judging means (CPU 61) judges as to whether or not the facsimile signal (NSF signal) includes a request (FIF) of transfer to a data communication after finishing a facsimile communication. Thereafter, a communication control means (CPU 61) responds a judging result of the judging means and, if the facsimile signal (NSF signal) indicates that the data communication is to be successively executed after finishing the facsimile communication, sends out a signal (answer signal; step STB17) directing initiation of the data communication after sending out image data, so as to switch communication mode from the facsimile communication mode to the data communication mode.

Moreover, in accordance with still another data communication apparatus, a signal detecting means (facsimile modem 66) detects a facsimile signal (NSF signal). An analyzing means (CPU 61) analyzes the facsimile signal (NSF signal). A judging means (CPU 61) judges as to whether or not the facsimile signal (NSF signal) includes a request (FIF) of transfer to a data communication after finishing a facsimile communication. And, a communication control means (CPU 61) responds a judging result of the judging means and, if the facsimile signal (NSF signal) indicates that the data communication is to be successively executed after finishing the facsimile communication, sends out an interrupt signal (PIP signal; STB16) directing interrupt after sending out image data and a signal (answer signal, STB17) directing initiation of the data communication after a predetermined time has elapsed since the interrupt of the facsimile communication, so as to switch the communication mode from the facsimile communication mode to the data communication mode.

When the retrieval ends, the personal computer 1 displays a message asking a question such as "Is facsimile communication required after finishing the data communication?" on its display screen. If the operator wants to terminate the communication, the operator will input "NO". With this input operation, the host computer responds to the interrupt of the carrier and immediately disconnects the telephone line without waiting the predetermined time T5. An instruction "D" of FIG. 4 represents the above operations. Subsequently, the operator directs the disconnection of the line by inputting an instruction "E". (Step STB18) Then, the data communication apparatus 6 terminates sending out the carrier. (Step STB19) In response to the carrier interrupt, the host computer disconnects the telephone line and ends the communication without waiting the predetermined time T5.

In a case where the operator wants to obtain the resultant information by the second retrieval, the operator will input "YES" through the instruction "D" and generates the instruction B commanding the facsimile communication. In this case, the data communication apparatus 6 interrupts the carrier and automatically sends out the NSF signal and the DIS signal after the predetermined time T6 has elapsed, as explained in the step STB11. Thereafter the procedure for the facsimile communication, defined by the steps STB12 and succeeding steps, is carried out. Although the PIP signal is used as an interrupt signal in this embodiment, another signal would be used instead of the PIP signal. In this manner, the disconnection of the telephone line is no longer necessary in transferring from the facsimile communication to the data communication; therefore, the mode switching operation can be automatically done without necessitating the complicated manual operation by the operator.

As apparent from the foregoing description, the present invention automatically switches the mode between the facsimile communication mode and the data communication mode when received a call in such a manner that, first of all, a signal from the calling party is received by the data communication mode an then, if a data communication mode signal is not received until the predetermined time has elapsed, the mode is transferred to the facsimile communication for waiting the facsimile signals. Thus, complicated manual operation is no longer necessary for switching the mode. Furthermore, automatic switching operation between the facsimile communication mode and the data communication mode is surely performed.

Still further, in the case where the communication mode is transferred from the data communication mode to the facsimile communication mode, the telephone line is not disconnected even after the carrier is stopped for waiting the facsimile signals, thereby realizing the automatic exchange of the communication mode. On the other hand, in the case where the communication mode is transferred from the facsimile communication mode to the data communication mode, this mode transfer is instructed in advance before initiating the facsimile communication, thereby realizing the automatic exchange of the communication mode in accordance with the non-standard procedure.

As this invention may be embodied in several forms without departing from the spirit of essential characteristics thereof, the present embodiment is therefore illustrative and not restrictive, since the scope of the invention is defined by the appending claims rather than by the description preceding them, and all changes that fall within meets and bounds of the claims, or equivalence of such meets and bounds are therefore intended to embraced by the claims.

What is claimed is:

1. A data communication apparatus comprising:
   modem means including a facsimile modem dedicated to facsimile communication and a data modem dedicated to data communication;
   instructing means for giving an instruction in response to an operator's decision before a data communication with an opponent party is finished, said instruction commanding a transfer to a facsimile communication mode after finishing a data communication mode;
   signal sending means for sending to the opponent party a command generated based on the instruction produced by said instructing means;
   signal detecting means for detecting a facsimile signal sent back from the opponent party in response to said command within a predetermined period of time after the data communication is terminated; and
   modem switching means for automatically switching operation of said modem means from said data modem to said facsimile modem in response to said facsimile signal detected by said signal detecting means without manually switching operation of said modem means, thereby executing a facsimile communication with the opponent party through said facsimile modem without disconnecting a communication line.

2. A data communication apparatus comprising:
   modem means including a facsimile modem dedicated to facsimile communication and a data modem dedicated to data communication;
   instructing means for producing an instruction after finishing a data communication mode, said instruction requesting a transfer to a facsimile communication mode;
   signal sending means for responding to said instruction and stopping a carrier being sent out;
   signal detecting means for waiting arrival of a signal sent from an opponent party without disconnecting a communication line for a predetermined period of time even after the data communication is terminated in response to the carrier stopped by said signal sending means; and
   modem switching means for switching operation of said mode means from said data modem to said facsimile modem in response to a facsimile signal when said facsimile signal is detected by said signal detecting means within said predetermined period of time, thereby executing a facsimile communication with the opponent party without disconnecting the communication line after finishing the data communication.

3. A data communication apparatus comprising:
   modem means including a facsimile modem dedicated to facsimile communication and a data modem dedicated to data communication;
   instructing means for giving an instruction in response to an operator's decision before a facsimile communication with an opponent party is started, said instruction commanding a transfer to a data communication mode after finishing a facsimile communication mode;

signal sending means for sending to the opponent party a facsimile signal (NSF) based on said instruction, said facsimile signal (NSF) including a content of the transfer to the data communication mode after finishing the facsimile communication mode;

signal detecting means for detecting a data communication signal sent from the opponent party within a predetermined period of time after the facsimile communication is terminated; and modem switching means for automatically switching operation of said modem means from said facsimile modem to said data modem in response to said data communication signal detected by said signal detecting means without manual switching operation of modem means, thereby executing a data communication with the opponent party through said data modem without disconnecting a communication line.

4. A data communication apparatus comprising:

modem means including a facsimile modem dedicated to facsimile communication and a data modem dedicated to data communication;

instructing means for giving an instruction in response to an operator's decision before a facsimile communication with an opponent party is started, said instruction commanding a transfer to a data communication mode after finishing a facsimile communication mode;

signal sending means for sending the opponent party a facsimile signal (NSF) based on said instruction, said facsimile signal (NSF) including a content of the transfer to the data communication mode after finishing the facsimile communication mode;

modem switching means for automatically switching operation of said modem means from said facsimile modem to said data modem in response to a data communication signal detected by a signal detecting means without manual switching operation of modem means, thereby executing a data communication with the opponent party through said data modem without disconnecting a communication line; and communication control means for terminating communication without executing data communication instructed by said instruction means by stopping a carrier being sent out after receiving image data, when another instruction is given based on an operator's decision for canceling the transfer to the data communication mode after the reception of image data and before communication mode is transferred to the data communication mode.

5. A data communication apparatus comprising:

signal detecting means for detecting a facsimile control signal (NSF) which is sent from an opponent party before sending out image data;

analyzing means for analyzing said facsimile control signal (NSF);

judging means for judging whether or not said facsimile control signal (NSF) includes a request of transfer to a data communication after finishing a facsimile communication; and communication control means for responding to a judging result of said judging means and, if said facsimile control signal (NSF) indicates that the data communication is to be executed after finishing the facsimile communication, sending out a signal directing initiation of the data communication when the facsimile communication is interrupted after completely sending out image data and a predetermined period of time has elapsed, in order to let the opponent party switch modem means from a facsimile modem dedicated to facsimile communication to a data modem dedicated to data communication.

6. A data communication apparatus comprising:

signal detecting means for detecting a facsimile signal;

analyzing means for analyzing said facsimile signal;

judging means for judging whether or not said facsimile signal includes a request of transfer to a data communication after finishing a facsimile communication; and communication control means for responding to a judging result of said judging means and, if said facsimile signal indicates that the data communication is to be successively executed after finishing the facsimile communication, sending out an interrupt signal directing interrupt of the facsimile communication after sending out image data and a signal directing initiation of the data-communication after a predetermined period of time has elapsed since said interrupt of the facsimile communication, so as to switch communication mode from a facsimile communication mode to a data communication mode.

7. A data communication apparatus in accordance with claim wherein said interrupt signal is a PIP (Procedure Interrupt Positive) signal.

8. A data communication method comprising steps of:

giving an instruction in response to an operator's decision before a data communication with an opponent party is finished, said instruction commanding a transfer to a facsimile communication mode after finishing a data communication mode;

sending to the opponent party a command generated based on said instruction;

detecting a facsimile signal sent back from said opponent party in response to said command within a predetermined period of time after the data communication is terminated; and automatically switching operation from a data modem dedicated to data communication to a facsimile modem dedicated to facsimile communication in response to the facsimile signal detected without manual switching operation of modem means, thereby executing a facsimile communication with the opponent party through said facsimile modem without disconnecting a communication line.

9. A data communication method comprising steps of:

giving an instruction after finishing a data communication mode, said instruction requesting a transfer to a facsimile communication mode;

responding to the instruction and stopping a carrier being sent out;

waiting arrival of a signal sent from an opponent party without disconnecting a communication line for a predetermined period of time even after the data communication is terminated in response to stopping of the carrier; and switching operation from a data modem dedicated to data communication to a facsimile modem dedicated to facsimile communication in response to a facsimile signal sent from said opponent party within said predetermined period of time, thereby executing a facsimile communication with the opponent party without disconnecting the communication line after finishing the data communication.

10. A data communication method comprising steps of:

giving an instruction in response to an operator's decision before a facsimile communication with an opponent party is started, said instruction commanding a transfer to a data communication mode after finishing a facsimile communication mode;

sending to the opponent party a facsimile signal (NSF) based on said instruction, said facsimile signal (NSF) including a content of the transfer to the data communication mode after finishing the facsimile communication mode;

detecting a data communication signal sent from the opponent party within a predetermined period of time after the facsimile communication is terminated; and automatically switching operation from a facsimile modem dedicated to facsimile communication to a data modem dedicated to data communication in response to the data communication signal detected without manual switching operation of modem means, thereby executing a data communication with the opponent party through said data modem without disconnecting a communication line.

11. A data communication method comprising steps of:

giving an instruction in response to an operator's decision before a facsimile communication with an opponent party is started, said instruction commanding a transfer to a data communication mode after finishing a facsimile communication mode;

sending to the opponent party a facsimile signal (NSF) based on the instruction, said facsimile signal (NSF) including a content of the transfer to the data communication mode after finishing the facsimile communication mode;

automatically switching operation from a facsimile modem dedicated to facsimile communication to a data modem dedicated to data communication in response to a data communication signal detected without manual switching operation of modem means, thereby executing a data communication with the opponent party through said data modem without disconnecting a communication line;

terminating communication without executing data communication instructed by stopping a carrier being sent out after receiving image data, when another instruction is given based on an operator's decision for canceling the transfer to the data communication mode after the reception of image data and before communication mode is transferred to the data communication mode.

12. A data communication method comprising steps of:

detecting a facsimile control signal (NSF) which is sent from an opponent party before sending out image data;

analyzing said facsimile control signal (NSF);

judging whether or not said facsimile control signal (NSF) includes a request of transfer to a data communication after finishing a facsimile communication; and responding to a judging result of above judgment and, if the facsimile control signal (NSF) indicates that the data communication is to be executed after finishing the facsimile communication, sending out a signal directing initiation of the data communication which the facsimile communication is interrupted after completely sending out image data and a predetermined period of time has elapsed, in order to let the opponent party switch operation from a facsimile modem dedicated to facsimile communication to a data modem dedicated to data communication.

13. A data communication method of comprising steps of:

detecting a facsimile signal;

analyzing said facsimile signal;

judging whether or not said facsimile signal includes a request of transfer to a data communication after finishing a facsimile communication; and responding to a judging result of above judgement and, if said facsimile signal (NSF signal) indicates that the data communication is to be successively executed after finishing the facsimile communication, sending out an interrupt signal directing interrupt of the facsimile communication after sending out image data and a signal directing initiation of the data communication after a predetermined period of time has elapsed since the interrupt of the facsimile communication, so as to switch communication mode from a facsimile communication mode to a data communication mode.

* * * * *